(12) United States Patent
Dray

(10) Patent No.: US 6,648,360 B1
(45) Date of Patent: Nov. 18, 2003

(54) COMBINATION PONTOON BOAT, TRAILER AND TRAVEL KIT

(75) Inventor: Douglas A. Dray, Beaver Dam, WI (US)

(73) Assignee: Karavan Trailers, Inc., Fox Lake, WI (US)

( * ) Notice: Subject to any disclaimer, the term of this patent is extended or adjusted under 35 U.S.C. 154(b) by 0 days.

(21) Appl. No.: 10/294,975

(22) Filed: Nov. 14, 2002

Related U.S. Application Data

(62) Division of application No. 09/755,300, filed on Jan. 5, 2001, now Pat. No. 6,481,737.

(51) Int. Cl.[7] .............................................. B62D 63/00
(52) U.S. Cl. ................................. 280/414.3; 280/414.1
(58) Field of Search ........................... 280/414.1, 414.3, 280/415.1; 114/361, 61.15, 344

(56) References Cited

U.S. PATENT DOCUMENTS

| | | | | |
|---|---|---|---|---|
| 4,114,772 A | * | 9/1978 | Beelow ...................... 214/512 |
| 4,801,153 A | * | 1/1989 | Wilson ...................... 280/414.1 |
| 5,853,185 A | * | 12/1998 | Marshburn ................ 280/414.1 |
| 6,003,888 A | * | 12/1999 | Godbersen ........... 280/124.169 |
| 6,257,167 B1 | * | 7/2001 | Joaquim .................. 280/414.1 |
| 6,439,145 B1 | * | 8/2002 | Mensch .................... 280/414.5 |

* cited by examiner

Primary Examiner—Daniel G. DePumpo
(74) Attorney, Agent, or Firm—Donald Cayen

(57) ABSTRACT

A pontoon trailer travel kit minimizes transverse spaces between a pontoon boat trailer and the pontoons of a pontoon boat. The kit comprises a bunk bracket that is mountable to and adjustable along a lift arm of the trailer. A bunk assembly is fastened to and is adjustable on the bunk bracket in directions perpendicular to the directions of adjustment of the bunk bracket. A kit is installed on a lift arm on each side of the trailer. The kits are pre-set such that the bunk of each bunk assembly is in close proximity to a pontoon. The boat is substantially prevented from sliding laterally on the trailer. In a modified embodiment, only the bunk assembly is used, and it is clamped directly to the trailer lift arm. That embodiment is used with boats in which the pontoons are exceptionally closely spaced to each other.

11 Claims, 4 Drawing Sheets

COMBINATION PONTOON BOAT, TRAILER AND TRAVEL KIT

This application is a divisional application of application Ser. No. 09/755,300, filed Jan. 5. 2001 now U.S. Pat. No. 6,481,737.

BACKGROUND OF THE INVENTION

1. Field of the Invention

This invention pertains to trailers, and more particularly to apparatus that enables a trailer to accommodate different size boats.

2. Description of the Prior Art

Various types of trailers have been developed to haul different kinds of cargo. For example, trailers for hauling boats, snowmobiles, personal watercrafts, and all-terrain vehicles are well known and in widespread use.

A rather specialized trailer is required to haul a pontoon boat. Pontoon boats are commercially available in a variety of deck widths and pontoon diameters. A pontoon boat trailer typically has a narrow width so as to fit between the boat pontoons. The pontoon boat trailer normally has a carriage that is raiseable and lowerable relative to the trailer frame. The trailer is used by lowering the carriage and rolling the trailer under the pontoon boat deck. The carriage is then raised to contact the deck and lift the boat off the ground or out of the water. Normally, the boat is tied to the carriage at the trailer front end.

Although pontoon boat trailers have been used successfully for many years, they nevertheless possess an undesirable characteristic. For practical considerations, pontoon boat trailers are usually made with a width that is slightly less than the expected narrowest distance between the pontoons of the boats to be hauled. When hauling such boats, any transverse spaces between the trailer and the pontoons are small, which makes the trailer satisfactory for holding the boats laterally on the trailer during hauling.

However, when the pontoon boat trailer is used with a pontoon boat that has a wider deck or smaller pontoons, there can be considerable transverse spaces between the trailer and the pontoons. In FIG. 1, for example, a pontoon boat trailer 1 is shown supporting a typical pontoon boat 3. There is a transverse distance D between the trailer carriage lift arms 21 and the boat pontoons 7. It is conceivable that the boat 3 could slide laterally on the carriage 19 through the distances D while the boat is being hauled. Such sliding would affect the location of the boat center of gravity relative to the trailer 1 and could tend to make the boat and trailer combination unstable.

Thus, a need exists for improvements in pontoon boat trailers.

SUMMARY OF THE INVENTION

In accordance with the present invention, an economical and versatile pontoon trailer travel kit is provided that substantially prevents a pontoon boat from sliding laterally on a pontoon boat trailer. This is accomplished by apparatus that includes a bunk adjustably mounted to a pontoon boat trailer lift arm.

According to one aspect of the invention, the pontoon trailer travel kit is comprised of a bunk bracket that is mounted to the trailer lift arm. The bunk bracket mounting is achieved in a way that enables the bunk bracket to be adjustable along the lift arm. In a preferred embodiment, the bunk bracket has a base plate that contacts the trailer lift arm and is held in place by fasteners. A pair of side plates extend perpendicularly from the base plate opposite the trailer lift arm.

The pontoon trailer travel kit further includes a bunk assembly that is fastened to the bunk bracket. The bunk assembly is composed of the bunk and two side walls that are slidable on the bunk bracket side plates in directions perpendicular to the directions of the adjustment of the bunk bracket on the trailer lift arm. The bunk assembly side walls are fastened to the bunk bracket side plates.

In use, a pontoon trailer travel kit is pre-set on each of two lift arms on opposite sides of the pontoon boat trailer. To do so, the distance between the pontoons of the boat to be hauled is measured. The bunk bracket fasteners are tightened to the lift arm so as to be approximately horizontal aligned with the boat pontoons. The bunk assemblies are slid relative to the bunk brackets until the bunks are spaced apart a distance slightly greater than the distance between the boat pontoons. The bunk assembly side walls are then tightly fastened to the bunk bracket side plates. After the pontoon trailer travel kits have been pre-set, the boat can be lifted and hauled in the usual manner. The kits assure that there is only minimal transverse spaces between the trailer and the pontoons through which the boat could slide while being hauled. The kits can be easily removed, if desired, when the boat is lowered again onto the ground or water.

Further in accordance with the present invention, the pontoon trailer travel kit can accommodate distances between boat pontoons that are too small for the kit described above. With closely spaced pontoons, the bunk bracket can be left unused. Instead, the bunk assembly is clamped directly to the lift arm. To do so, the bunk assembly side walls straddle the lift arm. The bunk assembly is positioned on the lift arm such that it is approximately aligned with the pontoon. Then the side walls are clamped by fasteners to the lift arm.

The method and apparatus of the invention, using mutually perpendicularly adjustable bunk brackets and bunk assemblies, thus removes substantially all transverse spaces between a pontoon boat trailer and the pontoons of a pontoon boat. The probability that the boat might slide laterally on the trailer is minimal, even though different size boats are haulable by a single trailer.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
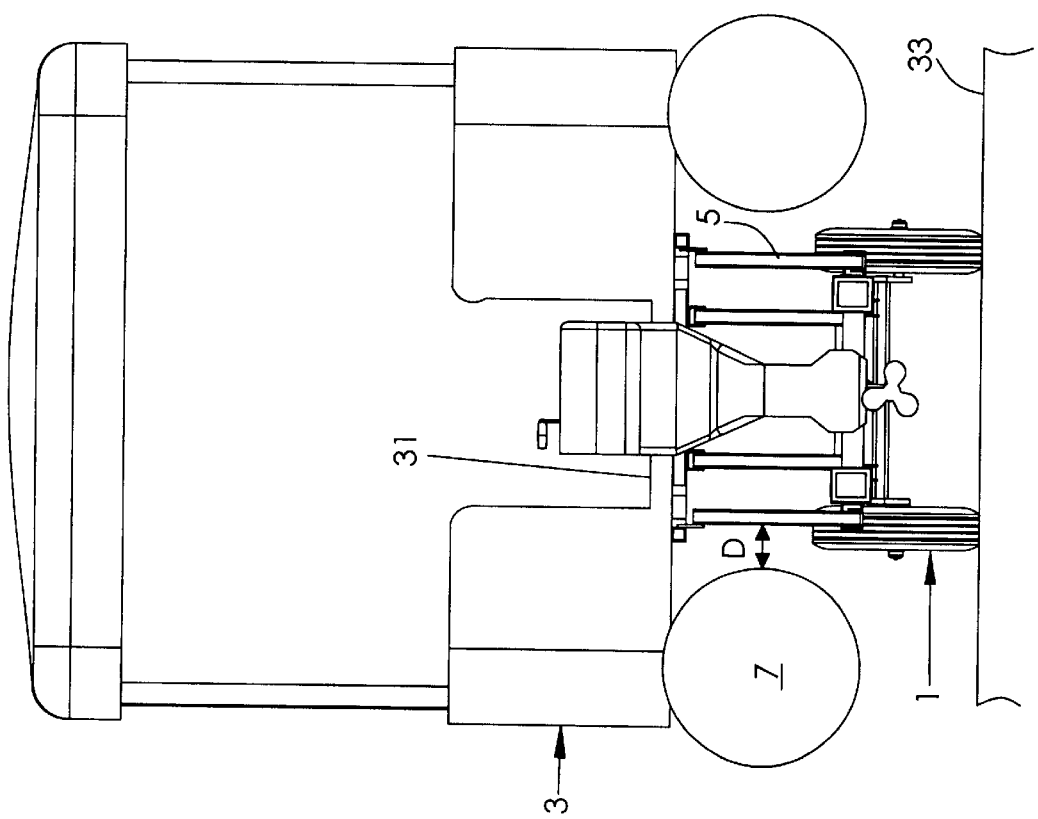
FIG. 1 is an end view of a typical pontoon boat supported by a typical pontoon boat trailer.
Figure 2:
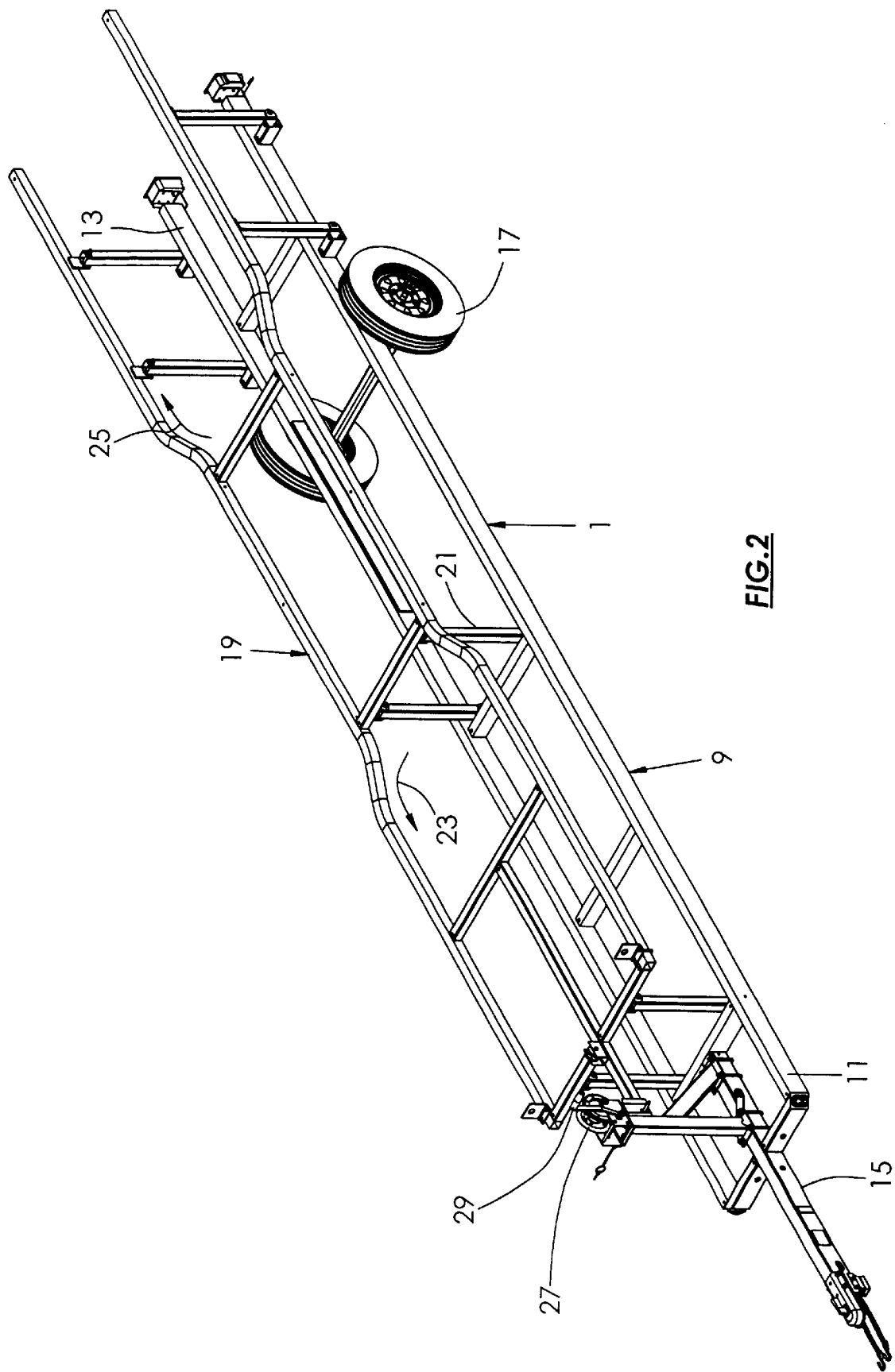
FIG. 2 is a perspective view of a typical pontoon boat trailer that advantageously uses the present invention.

Referring to FIG. 2, a typical pontoon boat trailer, which may be the same as the pontoon boat trailer 1 of FIG. 1, is illustrated. The pontoon boat trailer has a longitudinally extending frame 9 having a front end 11 and a back end 13. A tongue 15 is at the frame front end 11. Wheels 17 support the trailer near its back end 13.

The pontoon boat trailer 1 further comprises the carriage 19, which is connected to the frame 9 by several lift arms 21. Each lift arm 21 is pivotable relative to both the carriage 19 and the frame. In FIG. 2, the carriage is shown in a raised configuration whereat the carriage is spaced above the frame by the height of the lift arms. From the raised configuration, the carriage is lowerable to a lowered configuration whereat the carriage rests on the frame. Raising and lowering the carriage is achieved by pivoting the lift arms in the directions of arrows 23 and 25, respectively. To provide adequate force to raise and lower the carriage, the pontoon boat trailer further comprises a winch mechanism 27, which includes a manually operated handle 29.

As mentioned previously in connection with FIG. 1, the pontoon boat trailer 1 is used by first lowering the carriage 19 to the lowered configuration. The trailer is rolled under the deck 31 and between the pontoons 7 of the pontoon boat 3. Then the winch 27 is operated by the handle 29 to raise the carriage to the raised configuration. Doing to causes the carriage to contact the boat deck 31 and lift the boat off the ground 33.

Figure 4:
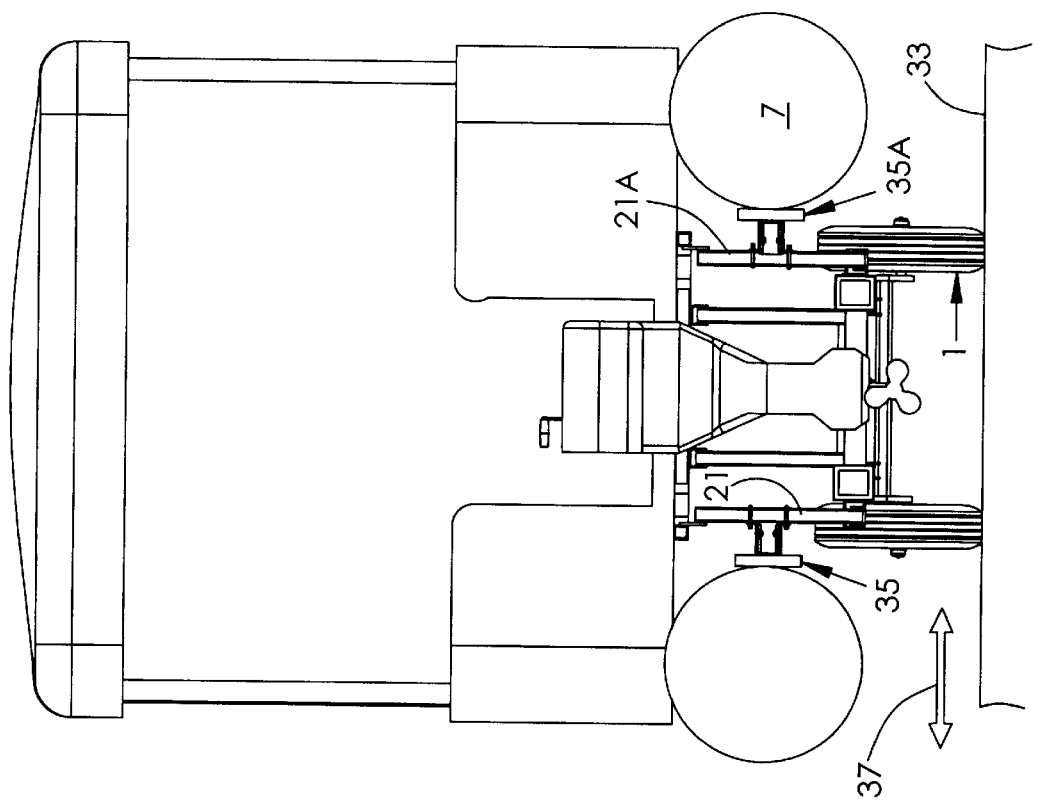
FIG. 4 is a view similar to FIG. 1, but showing a pontoon trailer travel kit installed on the pontoon boat trailer.
Figure 3:
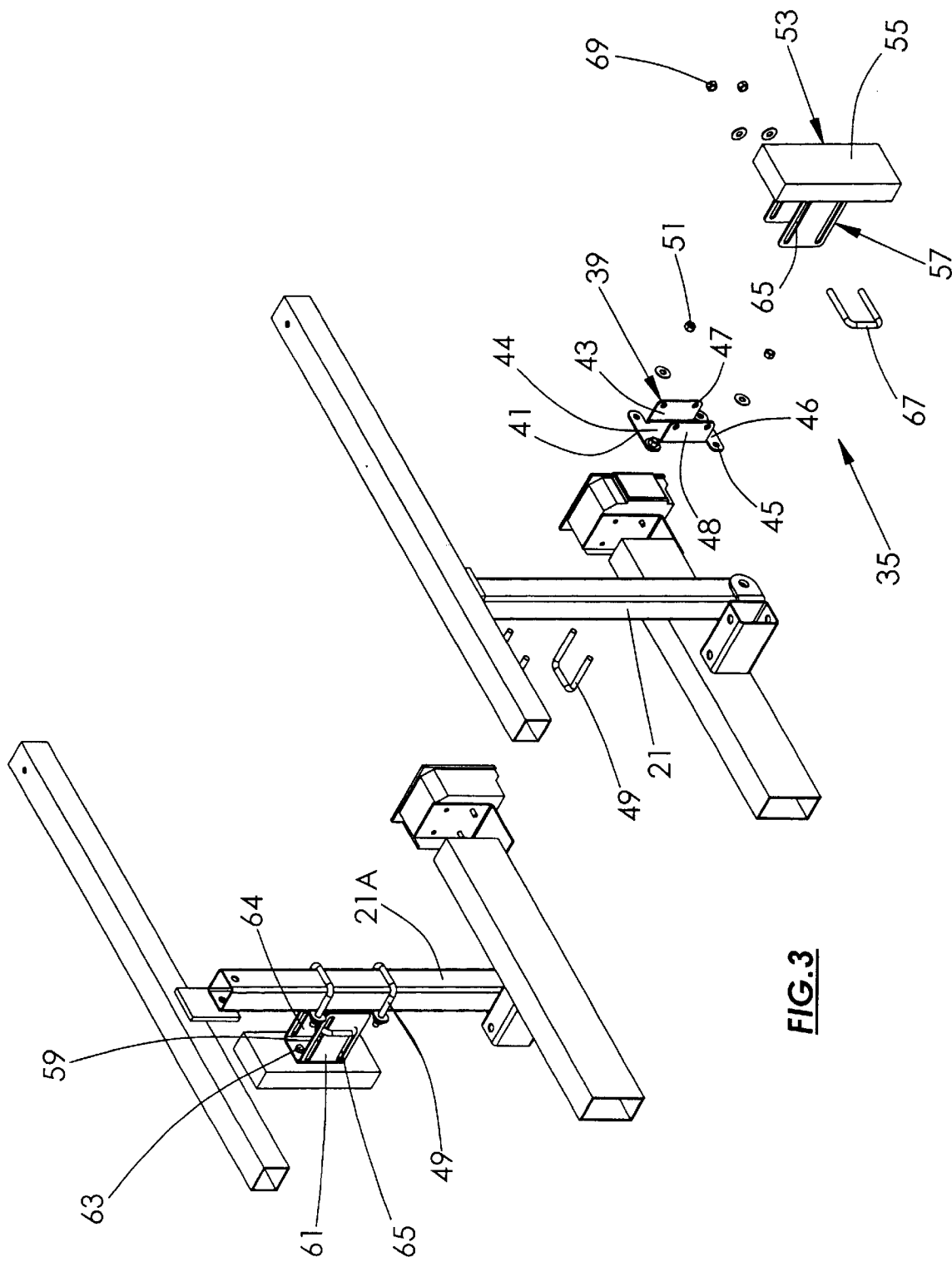
FIG. 3 is an exploded perspective view on an enlarged scale of the pontoon trailer travel kit of the invention.

In accordance with the present invention, and also looking at FIGS. 3 and 4, a pontoon trailer travel kit 35 is incorporated into the pontoon boat trailer 1. The pontoon trailer travel kit 35 is designed and functions to take up the distance D between the pontoons 7 and the lift arms 21 of the trailer such that the boat 3 does not slide laterally in the directions of arrows 37 when the trailer hauls the pontoon boat over the ground 33.

The pontoon trailer travel kit 35 is comprised of a generally U-shaped bunk bracket 39 having a base plate 41 and a pair of side plates 43. The base plate 41 is generally H-shaped, having a middle section 44 and a tab 46 at each corner of the middle section. The side plates 43 upstand from the middle section 44. The distance between the outside surfaces 48 of the side plates is approximately equal to the width of the pontoon boat trailer lift arm 21. The tabs 46 project outwardly beyond the planes of the outside surfaces 48 of the side plates. The base plate tabs have respective holes 45 through them. Each side plate 43 has a pair of holes 47 through it.

The bunk bracket 39 is mounted by placing the base plate 41 against a lift arm 21 of the pontoon boat trailer 1. A pair of U-bolts 49 straddle the lift arm and pass through the tab holes 45. Nuts 51 threaded onto the U-bolts 49 complete the mounting.

The pontoon trailer travel kit 35 further comprises a bunk assembly 53. In the preferred embodiment, the bunk assembly 53 is comprised of a bunk 55 and a channel 57. The bunk 55 may be a rectangular wood block that is covered with a fabric. The channel 57 has an end wall 59 and side walls 61. The channel end wall 59 is joined to the block 55, as by a conventional screw 63. The distance between the inside surfaces 64 of the channel side walls 61 is slightly greater than the distance between the outside surfaces 48 of the bunk bracket side plates 43. The channel side walls 61 have a pair of slots 65 perpendicular to the end wall. The slots 65 are spaced apart to receive a U-bolt 67.

The channel side walls 61 are placed over the bunk bracket side plates 43. A U-bolt 67 passes through the channel slots 65 and the holes 47 in the bunk bracket side plates and is held there by nuts 69.

The pontoon trailer travel kit 35 is normally pre-set on the trailer lift arm 21. The kit is positioned such that the center of the bunk 55 is approximately horizontally aligned with a boat pontoon 7, and the nuts 51 are tightened. A second kit 35A is installed in the same way on the lift arm 21A on the opposite side of the trailer 1.

The distance between the pontoons 7 of the boat 3 to be hauled is measured. The nuts 69 are loosened to enable the bunk assemblies 53 to slide horizontally on the bunk brackets 39 until the bunks 55 are at a distance from each other of approximately one inch to two inches less than the distance between the boat pontoons. At that point, the nuts 69 are retightened.

The pontoon boat trailer 1 is used in a normal fashion to support a pontoon boat 3 off the ground 33. When the two kits 35 and 35A are properly installed, the minimal spacing between the pontoons and the bunks substantially prevent the pontoon boat from sliding in the lateral directions 37 on the trailer carriage 19. The vertical adjustment provided by the U-bolts 49 and the horizontal adjustments provided by the U-bolts 67 enable the pontoon trailer travel kits to be used with a wide range of widths for the pontoon boat deck 31 and diameters of the pontoons 7. The ease with which the pontoon trailer travel kit is installed on a boat trailer lift arm 21 makes the kit ideal for retrofitting existing trailers. Further, the kit can be readily removed from a trailer for storage, if desired.

Figure 5:
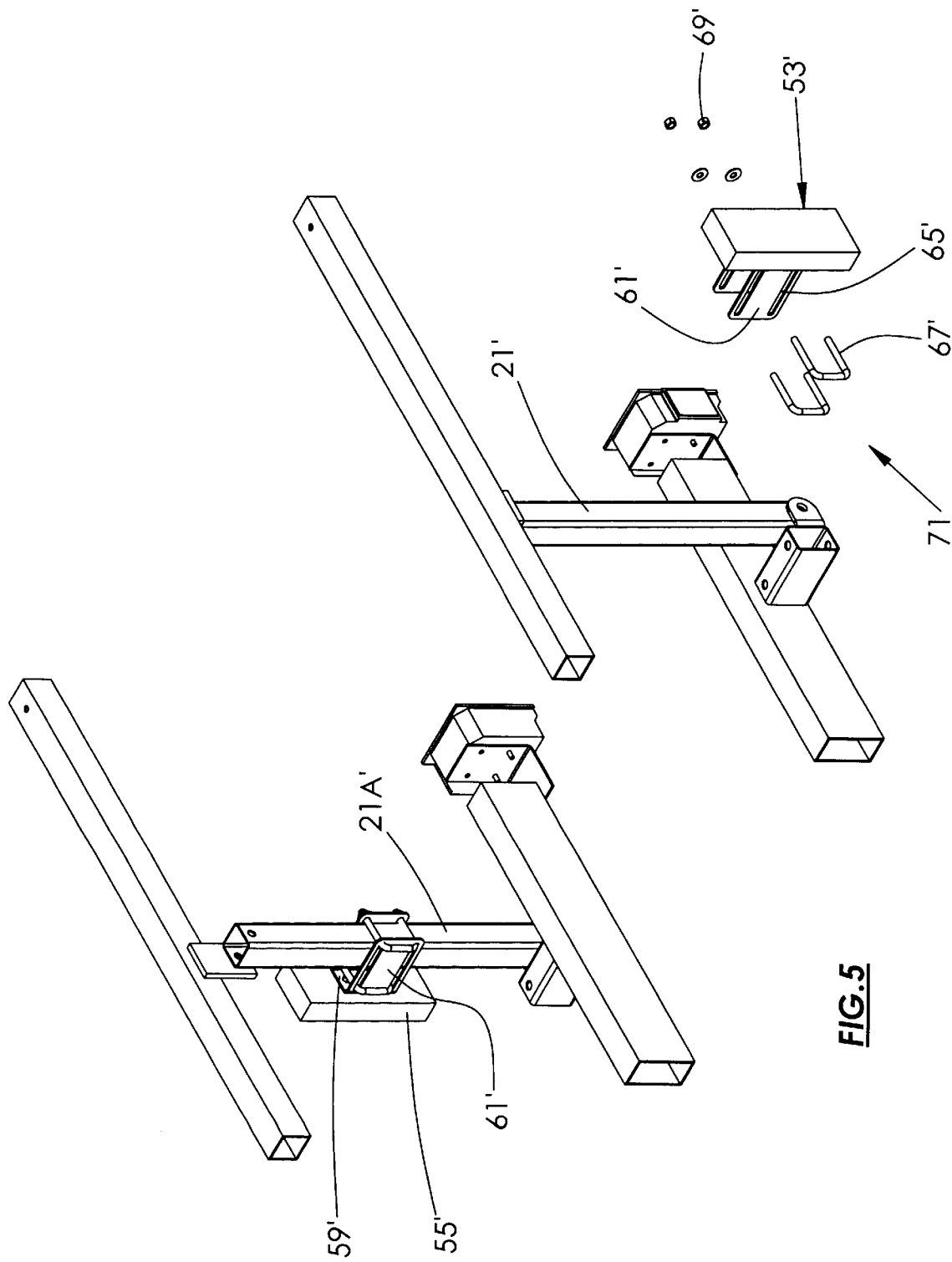
FIG. 5 is an exploded perspective view on an enlarged scale of a modified embodiment of the invention.

Some pontoon boats have exceptionally narrow spaces between the pontoons. In those instances, a modified pontoon trailer travel kit 71 as shown in FIG. 5 is used. The pontoon trailer travel kit 71 is comprised only of a bunk assembly 53'. Specifically, a channel end wall 59' is joined to a bunk 55'. The channel side walls 61' fit rather loosely over a pontoon boat trailer lift arm 21'. U-bolts 67' pass through slots 65' in the channel side walls 61'. Nuts 69' tighten on the U-bolts 67' to clamp the trailer lift arm 21' between the channel side walls 61'. The U-bolts 67' and nuts 69' enable vertical adjustment of the kit 71. The slots 67' permit adjustment of the bunk 55' in directions toward and away from the lift arm 21'.

In summary, the results and advantages of pontoon boats and pontoon boat trailers can now be more fully realized. The pontoon trailer travel kit not only substantially prevents lateral sliding of a pontoon boat on a pontoon boat trailer, but also is rapidly and easily pre-set to suit different size pontoon boats on a single trailer. This desirable result comes from using the combined functions of the bunk assembly and the trailer lift arm. The bunk bracket is mountable on the trailer lift arm at the position that best matches the pontoon of the particular boat to be hauled. The bunk assemblies are adjusted horizontally on the bunk brackets to a pre-set distance. When the two kits are installed, the boat is substantially prevented from sliding laterally on the trailer. For boats with exceptionally short distances between the pontoons, a modified pontoon trailer travel kit eliminates the bunk bracket. The bunk assembly is clamped directly to the trailer lift arm, on which it is vertically and horizontally adjustable. The kit is easily installed on and removed from the trailer, so it is ideal for retrofitting many different model pontoon boat trailers.

It will also be recognized that in addition to the superior performance of the invention, its cost is such as to be almost negligible in relation to the benefits it provides. Also, because it is made of a simple design and with rugged components, it gives long service life with minimal maintenance.

Thus, it is apparent that there has been provided, in accordance with the invention, pontoon trailer travel kit that satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In combination:
   a. a pontoon boat trailer having a frame, a carriage, and first and second lift arms for raising and lowering the carriage on the frame;
   b. a pontoon boat having a deck supported by the pontoon boat trailer carriage and first and second pontoons; and
   c. apparatus for substantially preventing lateral sliding of the pontoon boat on the pontoon boat trailer carriage comprising:
      i. first and second bunk brackets, each comprising a base plate and a pair of parallel side plates;
      ii. means for mounting each bunk bracket to respective first and second lift arm in alignment with respective pontoons;
      iii. first and second bunk assemblies in operative association with the first and second bunk brackets, respectively, each bunk assembly comprising a bunk and a channel joined thereto, each channel having a pair of side walls that slide over the associated bunk bracket side plates; and
      iv. means for fastening the first and second bunk assemblies to the associated bunk brackets with the respective bunks being in close proximity to the first and second boat pontoons, so that only minimal transverse spaces are present between the boat pontoons and the bunks.

2. The combination of claim 1, wherein:
   a. each bunk bracket base plate has a middle section, and multiple tabs projecting outwardly from the middle section, each tab having a hole therethrough; and
   b. the side plates of each bunk bracket upstand from the base plate middle section and have respective outer surfaces that are spaced apart a distance generally equal to the width of the pontoon boat trailer lift arms.

3. The combination of claim 2 wherein the means for mounting each bunk bracket comprises at least one first U-bolt that straddles the associated lift arm and that passes through the holes of two tabs of the bunk bracket base plate.

4. The combination of claim 1 wherein the means for fastening each bunk assembly to the associated bunk bracket comprises at least one second U-bolt that passes through openings in the side walls of the bunk assembly channel and through openings in the bunk bracket side plates.

5. In combination with a pontoon boat having a deck and spaced apart first and second pontoons; and a pontoon boat trailer having a carriage that supports the pontoon boat deck, first and second lift arms of predetermined width that raise and lower the carriage and that are transversely spaced from the first and second pontoons, respectively, first and second pontoon trailer travel kits mounted to the first and second pontoon boat trailer lift arms, respectively, each pontoon trailer travel kit comprising:
   a. a bunk assembly comprising a bunk, and a pair of side walls; and
   b. means for clamping the bunk assembly to the pontoon boat trailer lift arm at a selected location therealong such that the bunk is in close proximity to an associated boat pontoon, wherein the means for clamping the bunk assembly to the pontoon boat trailer lift arm comprises at least one U-bolt that passes through the bunk assembly side walls, and fasteners that cooperate with said at least one U-bolt to clamp the channel side walls to the lift arm, so that only minimal transverse spaces are present between the boat pontoons and the first and second pontoon trailer travel kits to thereby substantially prevent the boat from sliding laterally on the carriage.

6. The combination of claim 5 wherein the bunk assembly side walls are formed with respective slots that enable the bunk assembly to be adjusted in directions toward and away from the lift arm.

7. In combination with a pontoon boat having a deck and spaced apart first and second pontoons; and a pontoon boat trailer having a carriage that supports the pontoon boat deck, first and second lift arms of predetermined width that raise and lower the carriage and that are transversely spaced from the first and second pontoons, respectively, first and second pontoon trailer travel kits mounted to the first and second pontoon boat trailer lift arms, respectively, each pontoon trailer travel kit comprising:
   a. a bunk assembly comprising a bunk, and a Pair of side walls; and
   b. means for clamping the bunk assembly to the pontoon boat trailer lift arm at a selected location therealong such that the bunk is in close Proximity to an associated boat pontoon, wherein the means for clamping the bunk assembly to the pontoon boat trailer lift arm comprises:
      i. a bunk bracket having a base plate in contact with the lift arm, and a pair of side plates in sliding contact with the bunk assembly side walls;
      ii. means for mounting the bunk bracket to the lift arm; and
      iii. means for fastening the bunk assembly to the bunk bracket, so that only minimal transverse spaces are present between the boat pontoons and the first and second pontoon trailer travel kits to thereby substantially prevent the boat from sliding laterally on the carriage.

8. The combination of claim 7 wherein:
   a. the bunk bracket base plate has a middle section that is placed against the lift arm, and a plurality of tabs that project from the middle section; and
   b. the means for mounting the bunk bracket comprises at least one second U-bolt that straddles the lift arm and that passes through holes in the bunk bracket base plate tabs.

9. The combination of claim 7 wherein the means for fastening the bunk assembly comprises at least one U-bolt that passes through first openings in the bunk assembly side walls and through aligned openings in the bunk bracket side plates.

10. The combination of claim 9 wherein the openings in the bunk assembly side walls are slots that allow adjustment of the bunk assembly in directions toward and away from the lift arm.

11. The combination of claim 7 wherein the side plates of the bunk bracket have respective outside surfaces that are spaced apart a distance substantially equal to the predetermined width of the lift arms.

* * * * *